United States Patent
Tillman, Jr.

(10) Patent No.: US 10,405,060 B2
(45) Date of Patent: Sep. 3, 2019

(54) METHOD AND APPARATUS FOR AUGMENTED REALITY PRESENTATION ASSOCIATED WITH A MEDIA PROGRAM

(71) Applicant: AT&T INTELLECTUAL PROPERTY I, L.P., Atlanta, GA (US)

(72) Inventor: Thomas M. Tillman, Jr., Hawthorne, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

(21) Appl. No.: 15/636,113

(22) Filed: Jun. 28, 2017

(65) Prior Publication Data
US 2019/0007750 A1    Jan. 3, 2019

(51) Int. Cl.
*H04N 21/81*    (2011.01)
*G06T 11/60*    (2006.01)
(Continued)

(52) U.S. Cl.
CPC ......... *H04N 21/8133* (2013.01); *G06T 11/60* (2013.01); *H04N 21/4122* (2013.01); *H04N 21/4415* (2013.01); *H04N 21/8146* (2013.01); *G06T 7/70* (2017.01); *G06T 2207/30201* (2013.01)

(58) Field of Classification Search
CPC .... G06T 19/006; G06T 11/60; H04N 21/8133
See application file for complete search history.

(56) References Cited

U.S. PATENT DOCUMENTS

| 5,986,692 A | 11/1999 | Logan et al. |
| 6,014,184 A | 1/2000 | Knee |

(Continued)

FOREIGN PATENT DOCUMENTS

| CN | 102595212 A | 7/2012 |
| CN | 105230005 | 5/2014 |

(Continued)

OTHER PUBLICATIONS

"AMD FirePro™ W600", www.amd.com, Apr. 4, 2014, 2 pages.
(Continued)

*Primary Examiner* — Ryan R Yang
(74) *Attorney, Agent, or Firm* — Guntin & Gust, PLC; Matthew Tropper

(57) ABSTRACT

Aspects of the subject disclosure may include, for example, determining that a display, upon which is being presented a media program, is within a field of view of a user who is using an augmented reality device; presenting, via the augmented reality device, a first augmented reality display region, wherein the first augmented reality display region shows information associated with the media program, and wherein the first augmented reality display region is positioned adjacent the display in the field of view of the user; determining, by the processing system, that the field of view of the user has been positioned such that the display is no longer in the field of view of the user; and presenting, via the augmented reality device, a second augmented reality display region, wherein the second augmented reality display region shows the media program that is being presented on the display. Other embodiments are disclosed.

20 Claims, 13 Drawing Sheets

(51) Int. Cl.
*H04N 21/41* (2011.01)
*H04N 21/4415* (2011.01)
*G06T 7/70* (2017.01)

(56) References Cited

U.S. PATENT DOCUMENTS

| | | | |
|---|---|---|---|
| 6,188,442 | B1 | 2/2001 | Narayanaswami |
| 6,744,926 | B1 | 6/2004 | Nishigaki |
| 6,922,815 | B2 | 7/2005 | Rosen et al. |
| 7,458,093 | B2 | 11/2008 | Dukes et al. |
| 7,861,166 | B1 | 12/2010 | Hendricks et al. |
| 8,368,721 | B2 | 2/2013 | McCoy |
| 8,434,117 | B2 | 4/2013 | de Heer et al. |
| 8,584,174 | B1 | 11/2013 | Angiolillo et al. |
| 8,668,561 | B2 | 3/2014 | Jones et al. |
| 8,745,258 | B2 | 6/2014 | Porter et al. |
| 8,773,331 | B2 | 7/2014 | Candelore et al. |
| 9,129,430 | B2 * | 9/2015 | Salter .............. G06F 3/013 |
| 9,131,166 | B2 | 9/2015 | Choi |
| 9,215,397 | B2 | 12/2015 | Ellis et al. |
| 9,219,967 | B2 | 12/2015 | Nguyen et al. |
| 9,319,735 | B2 | 4/2016 | Knee et al. |
| 9,524,282 | B2 | 12/2016 | Algreatly et al. |
| 10,073,262 | B2 * | 9/2018 | Nakai .............. G06K 9/00671 |
| 2004/0261106 | A1 | 12/2004 | Hoffman et al. |
| 2005/0239549 | A1 | 10/2005 | Salvatore et al. |
| 2008/0032797 | A1 | 2/2008 | Harris et al. |
| 2008/0062318 | A1 | 3/2008 | Ellis et al. |
| 2008/0088706 | A1 | 4/2008 | Girgensohn et al. |
| 2011/0164163 | A1 * | 7/2011 | Bilbrey .............. G06F 1/1694 348/333.01 |
| 2012/0174173 | A1 | 7/2012 | Brood et al. |
| 2012/0314087 | A1 | 12/2012 | Tong et al. |
| 2013/0021524 | A1 | 1/2013 | Tang et al. |
| 2013/0046856 | A1 | 2/2013 | Joong et al. |
| 2013/0083003 | A1 | 4/2013 | Perez et al. |
| 2013/0151603 | A1 | 6/2013 | Lobb et al. |
| 2014/0011587 | A1 | 1/2014 | Hughes et al. |
| 2014/0085437 | A1 | 3/2014 | Unkel et al. |
| 2014/0362201 | A1 | 12/2014 | Nguyen et al. |
| 2014/0375683 | A1 * | 12/2014 | Salter .............. G06F 3/013 345/633 |
| 2015/0248792 | A1 | 9/2015 | Abovitz et al. |
| 2015/0317829 | A1 * | 11/2015 | Carter .............. G02B 27/01 345/633 |
| 2015/0325054 | A1 * | 11/2015 | Salter .............. G06F 3/013 345/633 |
| 2016/0071546 | A1 | 3/2016 | Neymotin et al. |
| 2016/0165308 | A1 | 6/2016 | Stern |
| 2016/0210784 | A1 * | 7/2016 | Ramsby .............. G06T 19/006 |
| 2016/0232183 | A1 | 8/2016 | Roberts |
| 2017/0244931 | A1 | 8/2017 | Faulkner |
| 2018/0063576 | A1 | 3/2018 | Tillman et al. |
| 2018/0302667 | A1 | 10/2018 | Tillman et al. |

FOREIGN PATENT DOCUMENTS

| | | |
|---|---|---|
| EP | 2826240 A1 | 1/2015 |
| WO | 2015148693 | 1/2015 |
| WO | 2016105322 | 6/2016 |
| WO | 2016119868 | 8/2016 |
| WO | 2016154663 A1 | 10/2016 |

OTHER PUBLICATIONS

"Arrive. Connect. Record. Multicamera event recording made simple", www.matrox.com, Aug. 8, 2014, 3 pages.

"Clarity Matrix MultiTouch", www.planar.com, Dec. 16, 2013, 2 pages.

"Expand and Customize to Suit Your Application", panasonic.net, Jul. 18, 2015, 4 pages.

Rushing, Krissy, "5 tips for creating a multiscreen sports haven", www.technologytell.com, Jan. 31, 2014, 5 pages.

Tillman, et al., "Methods and Systems for Providing Multiple Video Content Streams", U.S. Appl. No. 15/251,059, filed Aug. 30, 2016.

* cited by examiner

100

```
┌─────────────────────────────────────────────────────────────┐
│ Determining, by a processing system including a processor  │
│ and an augmented reality device, that a display, upon which │
│ is being presented a media program, is within a field of    │
│ view of a user who is using the augmented reality device,   │
│ wherein the display is not part of the augmented reality    │
│ device and wherein the field of view of the user is         │
│ presented to the user via the augmented reality device      │
│ 602                                                         │
└─────────────────────────────────────────────────────────────┘
                              │
                              ▼
┌─────────────────────────────────────────────────────────────┐
│ Presenting, via the augmented reality device, a first       │
│ augmented reality display region, wherein the first         │
│ augmented reality display region shows information          │
│ associated with the media program, and wherein the first    │
│ augmented reality display region is positioned adjacent the │
│ display in the field of view of the user                    │
│ 604                                                         │
└─────────────────────────────────────────────────────────────┘
                              │
                              ▼
┌─────────────────────────────────────────────────────────────┐
│ Determining, by the processing system, that the field of    │
│ view of the user has been changed such that the display is  │
│ no longer in the field of view of the user                  │
│ 606                                                         │
└─────────────────────────────────────────────────────────────┘
                              │
                              ▼
┌─────────────────────────────────────────────────────────────┐
│ Responsive to the determining that the field of view of the │
│ user has been changed such that the display is no longer in │
│ the field of view of the user, presenting, via the          │
│ augmented reality device, a second augmented reality        │
│ display region, wherein the second augmented reality        │
│ display region shows the media program that is being        │
│ presented on the display                                    │
│ 608                                                         │
└─────────────────────────────────────────────────────────────┘
```

Obtaining an identification of a participant in a sporting event that is being presented on a display that is within a field of view of a viewer who is using an augmented reality device, wherein the display is not part of the augmented reality device, wherein the field of view of the user is presented to the user via the augmented reality device, and wherein the obtaining the identification results in an identified participant

642

Obtaining images of the display presenting the sporting event, wherein the images are from a camera of the augmented reality device, and wherein the camera comprises a still image camera, a video camera, or any combination thereof

644

Distinguishing, in the images of the display, the identified participant, wherein the distinguishing is based upon one of facial recognition applied to the images, recognition of a number or other indicium on clothing shown in the images, or any combination thereof

646

Presenting, via the augmented reality device, an augmented reality marker, wherein the augmented reality marker is overlaid on the display in such a manner as to indicate to the viewer where the identified participant is on the display

Detecting, by the system, one or more objects that are within a field of view of a user who is using an augmented reality device, wherein the one or more objects are not part of the augmented reality device and wherein the field of view of the user is presented to the user via the augmented reality device
662

Determining, by the system, that the one or more objects are being presented in a media program
664

Presenting, via the augmented reality device, a first augmented reality display region, wherein the first augmented reality display region shows information associated with the one or more objects that are within the field of view of the user, and wherein the first augmented reality display region is positioned in the field of view of the user
666

Determining, by the system, that the field of view of the user has been changed such that the one or more objects are no longer in the field of view of the user
668

Responsive to the determining that the field of view of the user has been changed such that the one or more objects are no longer in the field of view of the user, presenting, via the augmented reality device, a second augmented reality display region, wherein the second augmented reality display region shows the media program
670

METHOD AND APPARATUS FOR AUGMENTED REALITY PRESENTATION ASSOCIATED WITH A MEDIA PROGRAM

FIELD OF THE DISCLOSURE

The subject disclosure relates to a method and apparatus for augmented reality presentation associated with a media program.

BACKGROUND

Conventional augmented reality headgear that is worn by a user permits the user to see the real world around the user, while also superimposing augmented images into the user's real world view.

In particular, certain conventional augmented reality systems (e.g., the MICROSOFT HOLOLENS™ use head-mounted equipment whose display is a visor, glasses or the like. Various augmented reality objects are "projected" in the user's field of view. For example, if a user wanted to "project" an image of the "Mona Lisa" on his or her wall, while wearing augmented reality headgear, the image could appear to be persistent and fixed in its location on the wall, regardless of the user's constant movement. In another example, this image could be "detached" from the wall and instead made to appear to be floating persistently a few feet in front of the user.

BRIEF DESCRIPTION OF THE DRAWINGS

Reference will now be made to the accompanying drawings, which are not necessarily drawn to scale, and wherein:

FIG. 6A depicts an illustrative embodiment of a method used in all or part of the systems described in FIGS. 1A-1B, 2A-2B, 3A-3B, 4A-4B, and/or 5A-5B;

FIG. 6B depicts an illustrative embodiment of a method used in all or part of the systems described in FIGS. 1A-1B, 2A-2B, 3A-3B, 4A-4B, and/or 5A-5B;

FIG. 6C depicts an illustrative embodiment of a method used in all or part of the systems described in FIGS. 1A-1B, 2A-2B, 3A-3B, 4A-4B, and/or 5A-5B;

DETAILED DESCRIPTION

The subject disclosure describes, among other things, illustrative embodiments for augmented reality presentations. Other embodiments are described in the subject disclosure.

One or more aspects of the subject disclosure include augmented reality mechanisms for presenting supplemental information in a field of view of a user. The supplemental information can relate to a media program (e.g., a sporting event) being shown on a television. In one example, the supplemental information can comprise fantasy league (e.g., fantasy football, fantasy basketball) information. In another example, the supplemental information can be selected and/or presented based upon a determination of which team or teams are playing in the sporting event being show on a television. In another example, a marker or other indicia may be presented to show where a particular player is located on the television.

Various embodiments provide a new, immersive approach to the AT&T NFL Sunday Ticket™ watching experience. In one specific example, a mechanism is provided for enhancing the NFL™ football viewing experience using wearable augmented reality devices to give AT&T NFL Sunday Ticket™ subscribers an enhanced, easy-to-use and accessible way of following their favorite games, teams, and players.

Various embodiments may be implemented in the context of (and/or by using features of) U.S. patent application Ser. No. 15/251,059, filed Aug. 30, 2016 and entitled METHODS AND SYSTEMS FOR PROVIDING MULTIPLE VIDEO CONTENT STREAMS. The content of U.S. patent application Ser. No. 15/251,059 is incorporated herein by reference in its entirety.

Figure 1A:
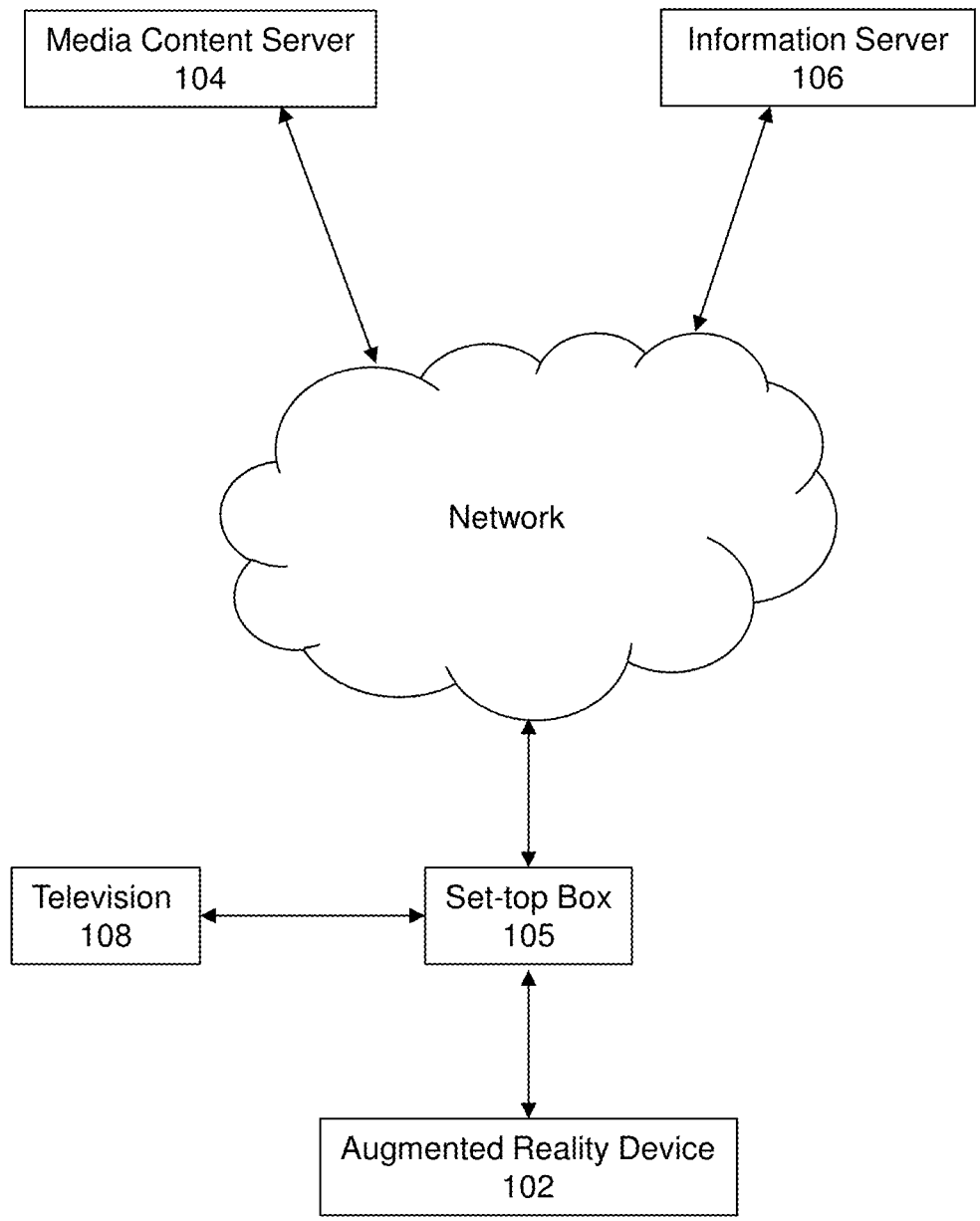
FIG. 1A depicts an illustrative embodiment of a system for augmented reality presentation.

Referring now to FIG. 1A, depicted is an illustrative embodiment of a system 100 for augmented reality presentation. An augmented reality device 102 (which can comprise, for example, glasses, goggles, a visor, a helmet and/or other headgear) is in communication (e.g., bidirectional communication) with set-top box 105. Set-top box 105 is in communication (e.g., bidirectional communication) with media content server 104 and information server 106. The communication between set-top box 105 and media content server 104 can be via a network (such as the Internet). The communication between set-top box 105 and information server 106 can be via a network (such as the Internet). The set-top box 105 can operate to provide media content to television 108. The media content can be obtained from media content server 104. The media content can be a media program comprising a live broadcast and/or a recorded broadcast. The media program can comprise a television program, a movie, a concert and/or a sporting event. The set-top box can operate to provide supplemental information to augmented reality device 102. The supplemental information can be obtained from information server 106. The supplemental information can relate to the media program being presented by the set-top box 105 on the television 108. In one example, the supplemental information can comprise statistics (e.g., team statistics and/or player statistics) related to a sporting event being presented on the television 108. In one example, the supplemental information can comprise fantasy league information related to a sporting event being presented on the television 108.

Figure 1B:
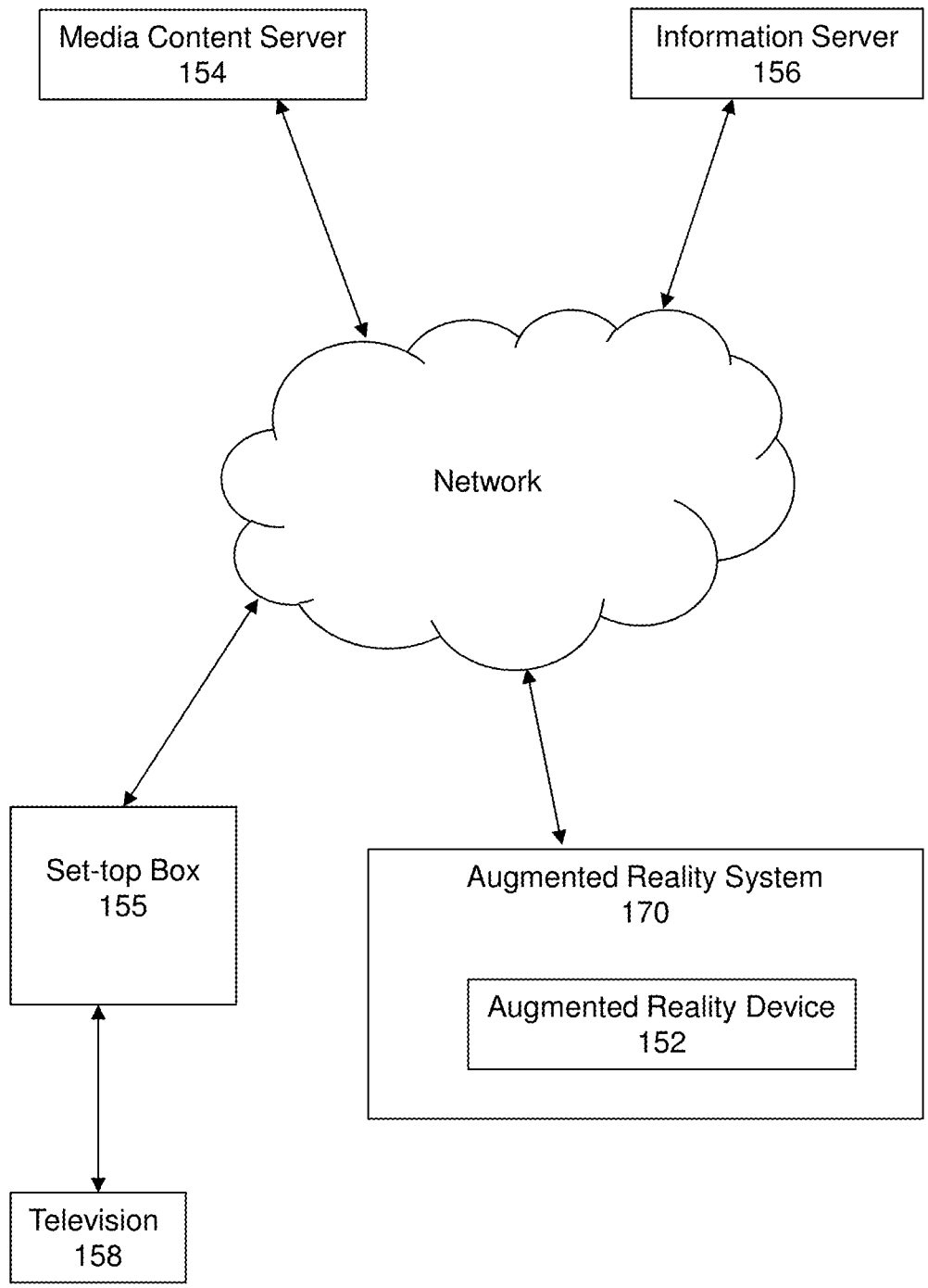
FIG. 1B depicts an illustrative embodiment of a system for augmented reality presentation.

Referring now to FIG. 1B, depicted is an illustrative embodiment of a system 150 for augmented reality presentation. An augmented reality device 152 is part of augmented reality system 170. The augmented reality device 152 can comprise for example, glasses, goggles, a visor, a helmet and/or other headgear. The augmented reality system 170 is in communication (e.g., bidirectional communication) with set-top box 105 (via the network, such as the Internet). The augmented reality system 170 is in communication (e.g., bidirectional communication) with media content server 154 and information server 156. The communication between augmented reality system 170 and media content server 154 can be via a network (such as the Internet). The communication between augmented reality system 170 and information server 156 can be via a network (such as the Internet). The set-top box 155 can operate to provide media content to television 158. The media content can be obtained from media content server 154. The media content can be a media program comprising a live broadcast and/or a recorded broadcast. The media program can comprise a television program, a movie, a concert and/or a sporting event. The augmented reality system 170 can operate to obtain supplemental information. The supplemental information can be obtained from information server 156. The supplemental information can relate to the media program being presented by the set-top box 155 on the television 158. In one example, the supplemental information can comprise statistics (e.g., team statistics and/or player statistics) related to a sporting event being presented on the television 158. In one example, the supplemental information can comprise fantasy league information related to a sporting event being presented on the television 158.

Figure 2A:
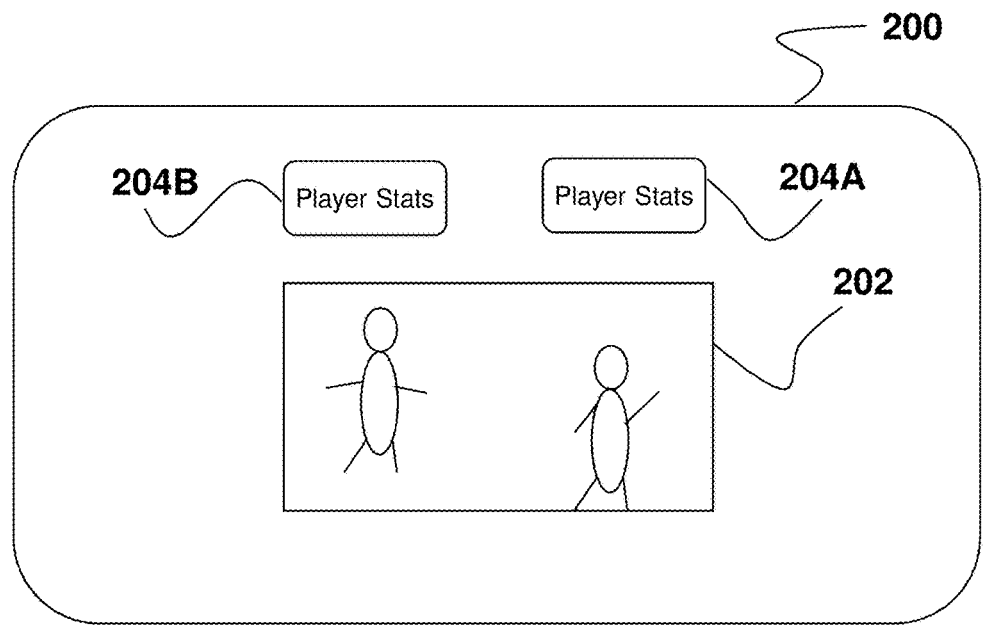
FIG. 2A depicts an example view of what is seen by a user through an augmented reality device according to an illustrative embodiment.

Referring now to FIG. 2A, this depicts an example view 200 of what is seen by a user through an augmented reality device according to an illustrative embodiment. This example view includes a television screen 202 (which is an actual, physical object) and augmented reality elements 204A and 204B. Each of augmented reality elements 204A and 204B does not physically exist in the room but, rather, is displayed in the user's field of view (see FIG. 2B, discussed below) by the augmented reality device being worn by the user. In one example, augmented reality element 204A is related to player statistics for one player (for example, on one team) and augmented reality element 204B is related to player statistics for another player (for example, on another team).

Figure 2B:
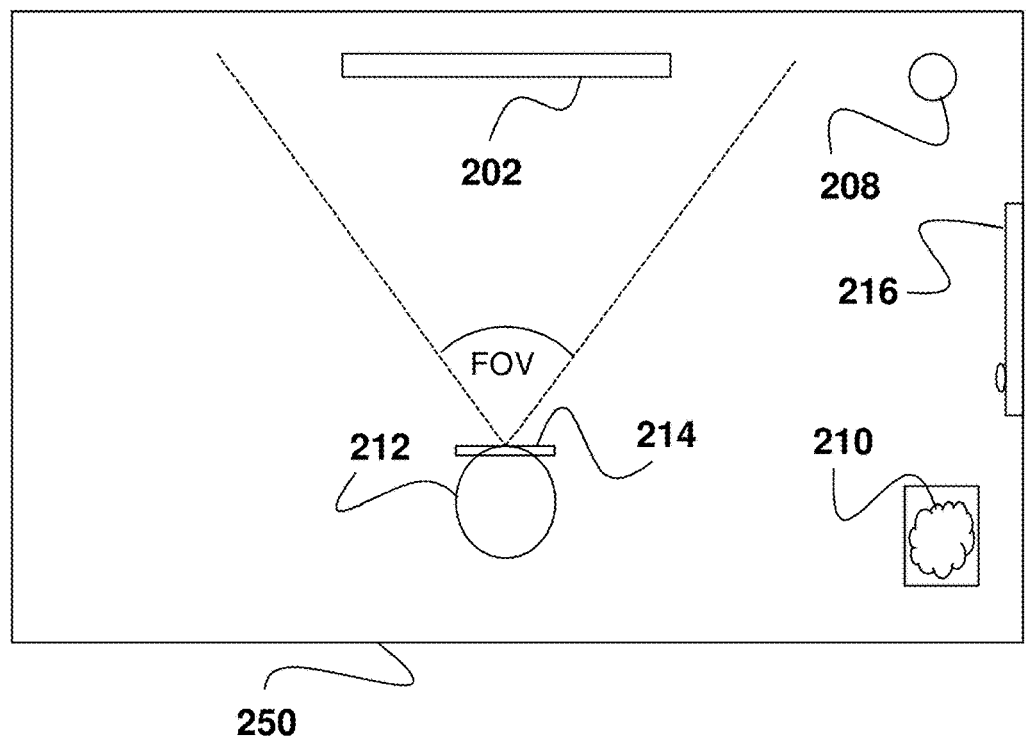
FIG. 2B depicts a top-down graphical representation of the user of FIG. 2A in a room during use of the augmented reality device according to an illustrative embodiment.

Referring now to FIG. 2B, this depicts a top-down graphical representation of the user 212 of FIG. 2A in a room 250 during use of the augmented reality device 214 (shown here schematically as goggles, or the like) according to an illustrative embodiment. As seen, the field of view (FOV) of the user 212 includes the television screen 202 (mounted, for example, on a wall). In addition, the room includes door 216, lamp 208 and plant 210 (which are not included in the user's field of view shown in FIGS. 2A and 2B.

Figure 3A:
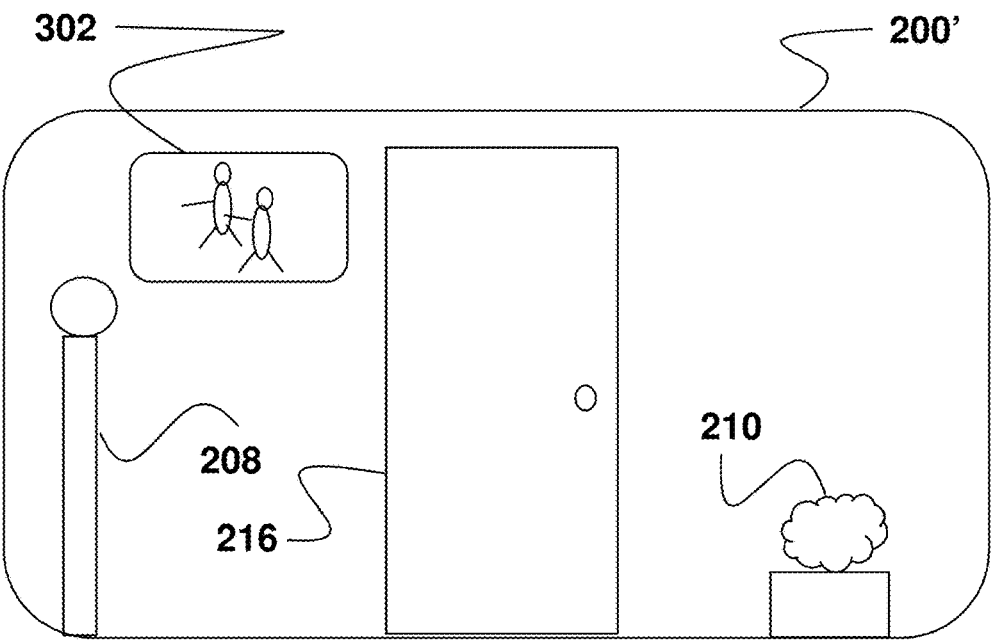
FIG. 3A depicts another example view of what is seen by the user of FIG. 2A through the augmented reality device according to an illustrative embodiment.
Figure 3B:
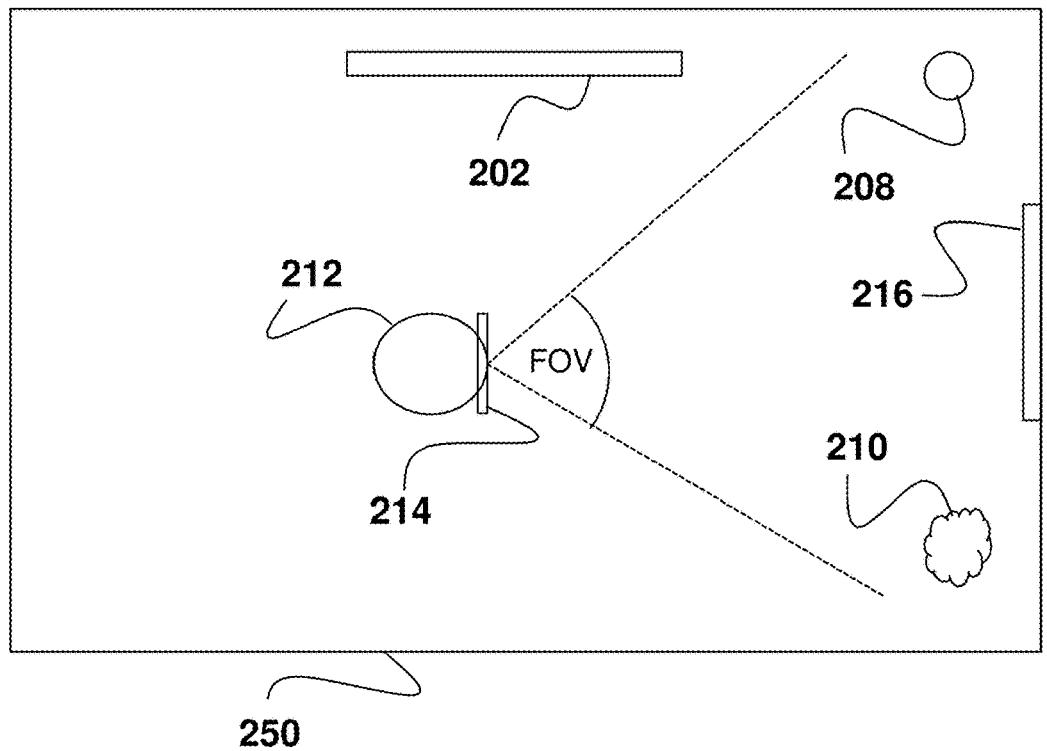
FIG. 3B depicts another top-down graphical representation of the user of FIG. 2A in the room of FIG. 2B during use of the augmented reality device according to an illustrative embodiment.

Referring now to FIG. 3A, this depicts another example view 200' of what is seen by the user 212 of FIGS. 2A and 2B through the augmented reality device 214 according to an illustrative embodiment. This view 200' now includes door 216, lamp 208 and plant 210 and excludes television screen 202 (FIG. 3B depicts another top-down graphical representation (corresponding to FIG. 3A) of the user 212 in the room 250. This view 200' includes augmented reality element 302. Augmented reality element 300 does not physically exist in the room but, rather, is displayed in the user's field of view. In this example, augmented reality element 302 replaces augmented reality elements 204A and 204B. In this example, augmented reality element 300 replicates the content of what is being displayed on television 202 (which is now outside the field of view of the user 212). Thus, in this embodiment, when the user looks away from the television (for instance, to go to a different room or to talk to a person sitting next to him or her) augmented reality element 302 is presented so that the user does not miss the content being presented on the television. In one example, when the user once again has the television in his or her field of view, the display can be returned to that such as shown in FIG. 2A.

Figure 4A:
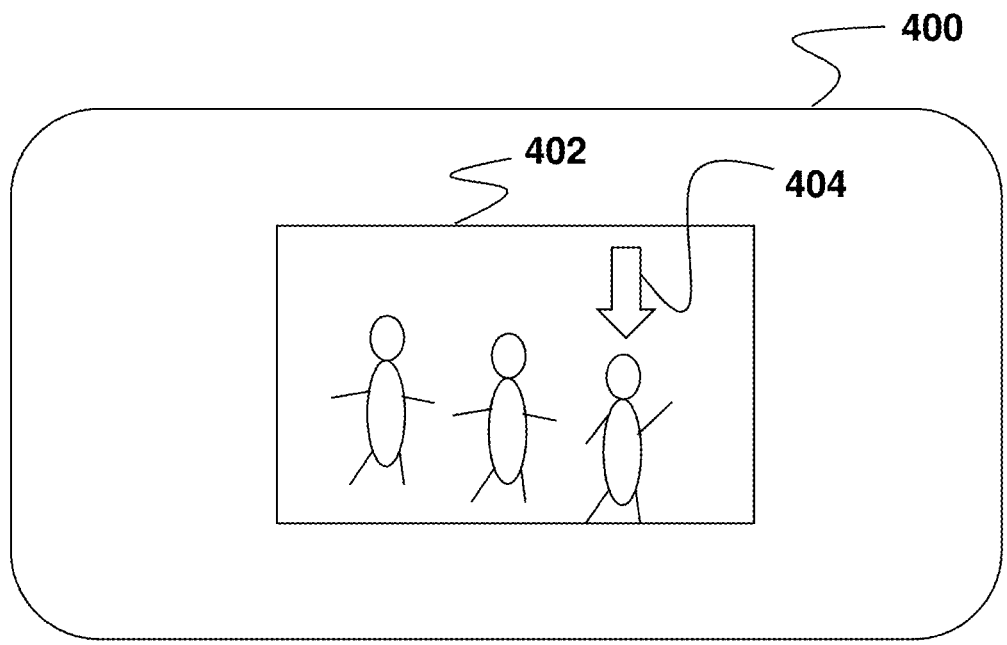
FIG. 4A depicts another example view of what is seen by a user through an augmented reality device according to an illustrative embodiment.

Referring now to FIG. 4A, this depicts an example view 400 of what is seen (at a first moment in time) by a user through an augmented reality device according to an illustrative embodiment. This view 400 shows television screen 402 (which is an actual, physical object). Television screen 402 is presenting, in this example, three players in a sporting event. One of the players (e.g., a player of interest to the user such as a player of the user's in a fantasy league) is marked by augmented reality marker 404. Augmented reality marker 404 does not physically exist in the room but, rather, is displayed in the user's field of view in an overlapping manner with respect to the television screen.

Figure 4B:
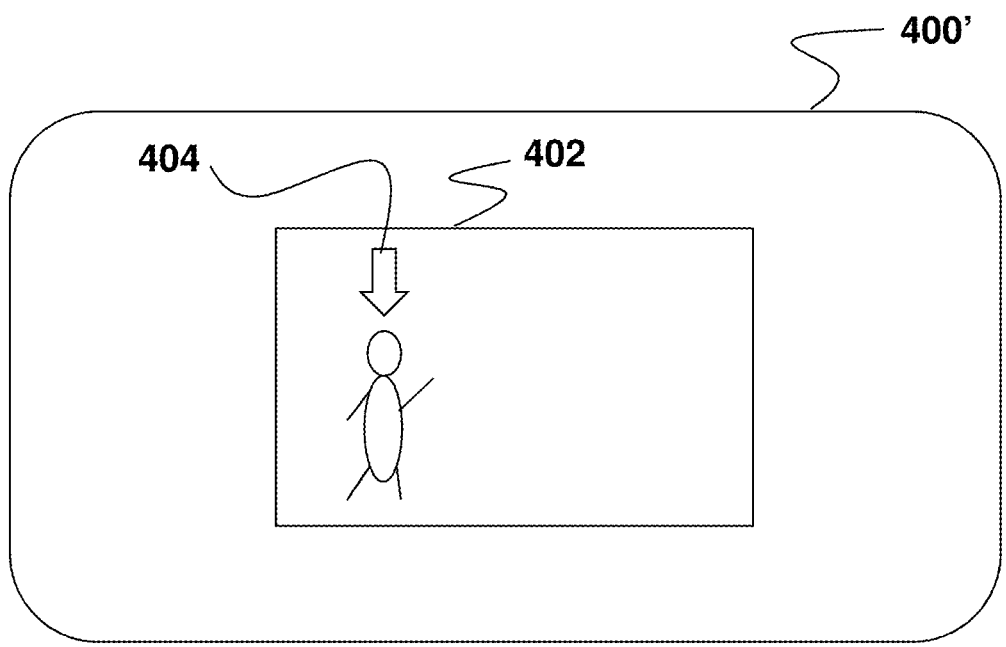
FIG. 4B depicts another example view of what is seen by the user of FIG. 4A through the augmented reality device according to an illustrative embodiment.

Referring now to FIG. 4B, this depicts an example view 400' of what is seen (at a second moment in time) by the user through the augmented reality device according to an illustrative embodiment. This view 400' at the second moment in time follows shortly after the view 400 at the first moment in time. In this view 400', the players have moved to the left of the television screen 402, with the two left-most players of view 400 now being off of the television screen 402. As seen, augmented reality marker 404 has followed the player of interest from the right-hand side of the television screen 402 to the left-hand side of the television screen 402.

Figure 5A:
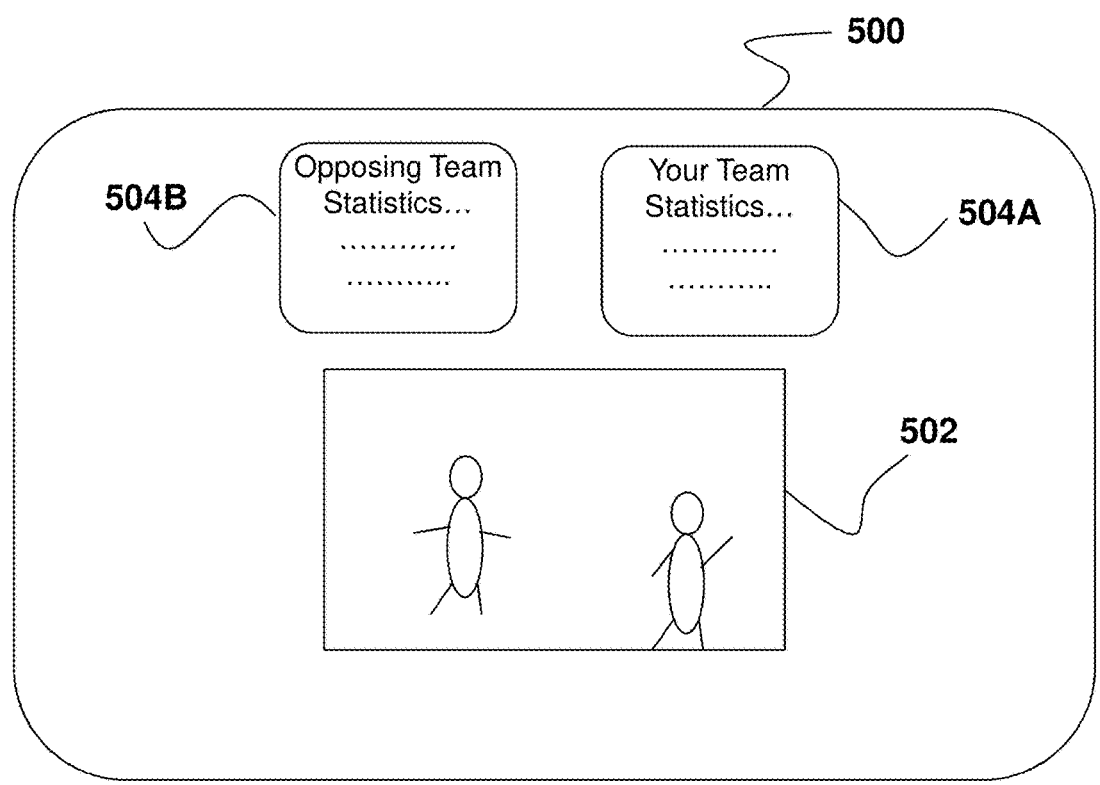
FIG. 5A depicts another example view of what is seen by a user through an augmented reality device according to an illustrative embodiment.

Referring now to FIG. 5A, this depicts an example view 500 of what is seen (at a first moment in time (unrelated to the times discussed with reference to FIGS. 4A and 4B)) by a user through an augmented reality device according to an illustrative embodiment. This view 500 shows television screen 502 (which is an actual, physical object). Television screen 502 is presenting, in this example, two players in a sporting event. Shown above the television 502 are first augmented reality display region 504A (showing, for example, team statistics for a user's selected or chosen team) and second augmented reality display region 504B (showing, for example, team statistics for an opposing team). First augmented reality display region 504A and second augmented reality display region 504B are not physical objects that exist I the room but, rather, are displayed in the user's field of view.

Figure 5B:
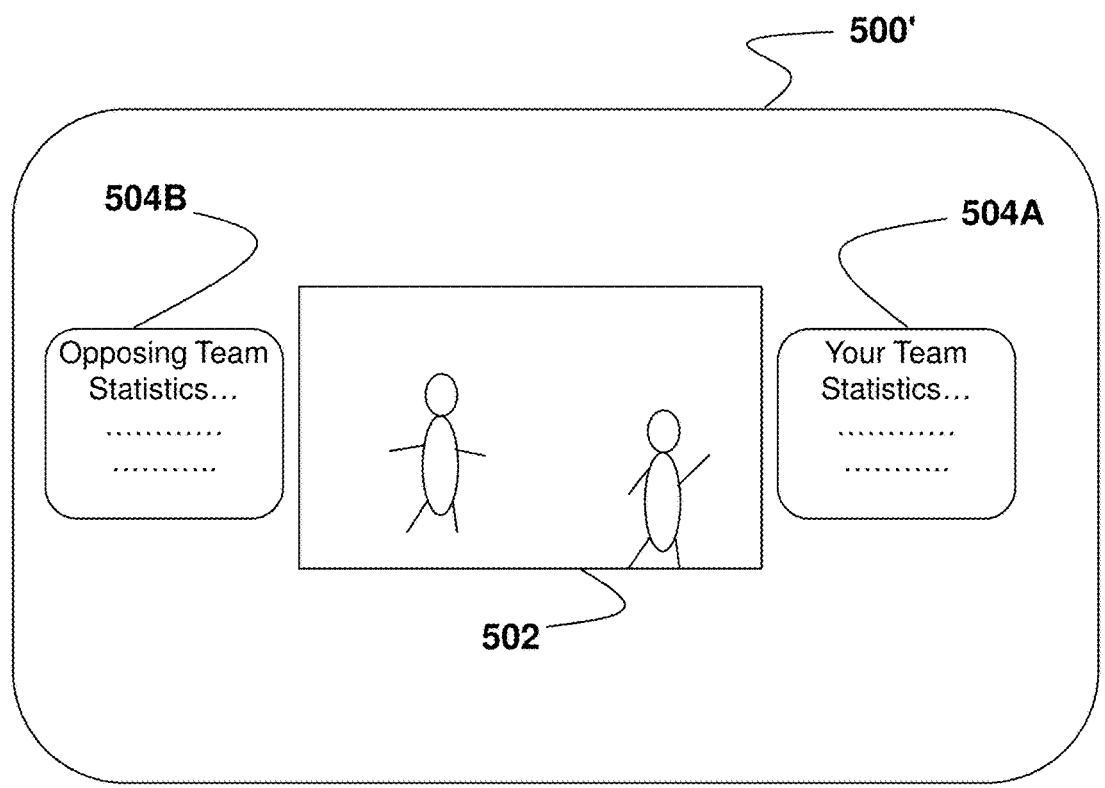
FIG. 5B depicts another example view of what is seen by the user of FIG. 5A through the augmented reality device according to an illustrative embodiment.

Referring now to FIG. 5B, this depicts an example view 500' of what is seen (at a second moment in time (unrelated to the times discussed with reference to FIGS. 4A and 4B)) by the user through the augmented reality device according to an illustrative embodiment. This view 500' at the second moment in time follows shortly after the view 500 at the first moment in time. In this view 500', the first augmented reality display region 504A has been moved to just outside of the right-hand side of the television screen 502 and the second augmented reality display region 504B has been moved to just outside of the left-hand side of the television screen 502. In various examples, each augmented reality display region can be moved based upon a user command and/or based upon certain visibility events (e.g., in response to a new light source or glare that appears in the room adjacent the television screen that could adversely affect visibility of one or more of the augmented reality display regions). In other examples, each augmented reality display region cans be initially placed based upon a user command and/or based upon certain visibility events (e.g., based upon an existing light source or glare that is in the room adjacent the television screen that could adversely affect visibility of one or more of the augmented reality display regions).

Referring now to FIG. 6A, this depicts an illustrative embodiment of a method used by devices of FIGS. 1A-1B, 2A-2B, 3A-3B, 4A-4B, and/or 5A-1B. While for purposes of simplicity of explanation, the respective processes are shown and described as a series of blocks in FIG. 6A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 6A, method 600 begins at step 602 with determining, by a processing system including a processor and an augmented reality device, that a display, upon which is being presented a media program, is within a field of view of a user who is using the augmented reality device, wherein the display is not part of the augmented reality device and wherein the field of view of the user is presented to the user via the augmented reality device. Method 600 then continues to step 604 with presenting, via the augmented reality device, a first augmented reality display region, wherein the first augmented reality display region shows information associated with the media program, and wherein the first augmented reality display region is positioned adjacent the display in the field of view of the user. Method 600 then continues to step 606 with determining, by the processing system, that the field of view of the user has been changed such that the display is no longer in the field of view of the user. Method 600 then continues to step 608 with responsive to the determining that the field of view of the user has been changed such that the display is no longer in the field of view of the user, presenting, via the augmented reality device, a second augmented reality display region, wherein the second augmented reality display region shows the media program that is being presented on the display.

Referring now to FIG. 6B, this depicts an illustrative embodiment of a method used by devices of FIGS. 1A-1B, 2A-2B, 3A-3B, 4A-4B, and/or 5A-1B. While for purposes of simplicity of explanation, the respective processes are shown and described as a series of blocks in FIG. 6B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 6B, method 640 begins at step 642 with obtaining an identification of a participant in a sporting event that is being presented on a display that is within a field of view of a viewer who is using an augmented reality device, wherein the display is not part of the augmented reality device, wherein the field of view of the user is presented to the user via the augmented reality device, and wherein the obtaining the identification results in an identified participant (in one example, the identified participant can be a particular player on a team; in another example, the identified participant can be a particular team). Method 640 then continues to step 644 with obtaining images of the display presenting the sporting event, wherein the images are from a camera of the augmented reality device, and wherein the camera comprises a still image camera, a video camera, or any combination thereof. Method 640 then continues to step 646 with distinguishing, in the images of the display, the identified participant, wherein the distinguishing is based upon facial recognition applied to the images, recognition of a number or other indicium on clothing shown in the images, or any combination thereof. Method 640 then continues to step 648 with presenting, via the augmented reality device, an augmented reality marker, wherein the augmented reality marker is overlaid on the display in such a manner as to indicate to the viewer where the identified participant is on the display.

Referring now to FIG. 6C, this depicts an illustrative embodiment of a method used by devices of FIGS. 1A-1B, 2A-2B, 3A-3B, 4A-4B, and/or 5A-1B. While for purposes of simplicity of explanation, the respective processes are shown and described as a series of blocks in FIG. 6C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 6C, method 660 begins at step 662 with detecting, by a system, one or more objects that are within a field of view of a user who is using an augmented reality device, wherein the one or more objects are not part of the augmented reality device and wherein the field of view of the user is presented to the user via the augmented reality device. Method 660 then continues to step 664 with determining, by the system, that the one or more objects are being presented in a media program. Method 660 then continues to step 666 with presenting, via the augmented reality device, a first augmented reality display region, wherein the first augmented reality display region shows information associated with the one or more objects that are within the field of view of the user, and wherein the first augmented reality display region is positioned in the field of view of the user. Method 660 then continues to step 668 with determining, by the system, that the field of view of the user has been changed such that the one or more objects are no longer in the field of view of the user. Method 660 then continues to step 670 with responsive to the determining that the field of view of the user has been changed such that the one or more objects are no longer in the field of view of the user, presenting, via the augmented reality device, a second augmented reality display region, wherein the second augmented reality display region shows the media program.

In another embodiment, an augmented reality system (and/or augmented reality device) can be used by a user at an event (e.g., a live event). For instance, a user can use the augmented reality system (and/or augmented reality device) while being present at a sporting event (such as at an outdoor venue (e.g., a stadium) or an indoor venue). In another example, a user can use the augmented reality system (and/or augmented reality device) while being present at a concert (such as at an outdoor venue (e.g., a stadium) or an indoor venue).

In one example, when used by a user while being present at a sporting event, a playing field and/or a scoreboard can be detected as an object in a media program (wherein the media program can be, for example, a television or Internet broadcast of the sporting event). The detection of the object (s) can be based upon image(s) obtained by a camera of the augmented reality system (and/or augmented reality device) as the camera is pointed towards the playing field and/or scoreboard. In one example, the image(s) can be compared against one or more television or Internet broadcasts to determine the media program. The comparing can be directed to one or more television or Internet broadcasts obtained from a content source (see, e.g., media content server 104 and media content server 154). When the user's field of view (e.g., through the augmented reality device) is changed such that the playing field and/or scoreboard are no longer in the field of view, the augmented reality system (and/or augmented reality device) can present to the user a display region that comprises the television or Internet broadcast of the sporting event (the augmented reality system (and/or augmented reality device) can obtain the television or Internet broadcast of the sporting event from a media content server (see, e.g., media content server 104 and media content server 154).

In another example, determining that the object(s) are no longer in the field of view can comprise determining that the object(s) are entirely outside the field of view or determining that some or all of the object(s) are at least partially outside the field of view.

In another embodiment, a method begins with obtaining images of a display presenting a sporting event, wherein the images are from a camera of an augmented reality device that is being used by a viewer, and wherein the camera comprises a still image camera, a video camera, or any combination thereof. The method then continues with determining, based upon the images of the display, a team (or other group of individuals) participating in the sporting event, wherein the determining results in an identified team (or other group of individuals). The method then continues with obtaining, based upon the identified team (or other group of individuals), information associated with the sporting event. The method then continues with presenting, via the augmented reality device, an augmented reality display region, wherein the augmented reality display region shows the information associated with the sporting event, and wherein the augmented reality display region is positioned adjacent the display in a field of view of the viewer.

In one example, the determining the team (or other group of individuals) participating in the sporting event comprises determining the team (or other group of individuals) participating in the sporting event based upon a design of a uniform shown in the images, one or more colors of a uniform shown in the images, or any combination thereof.

In another example, the information associated with the sporting event comprises fantasy league information, wherein the sporting event involves two teams (or other group of individuals), and wherein the determining the team (or other group of individuals) participating in the sporting event comprises determining both teams (or other group of individuals).

As described herein, various embodiments provide an immersive sports viewing experience with augmented reality.

As described herein, various embodiments provide an augmented reality system applied to watching television. In one specific example, the augmented reality system is applied to watching a sporting event on television. For example, a user can be watching a football game on television. The augmented reality system can superimpose various player statistics into the view. In one specific example, the statistics could be related to football (e.g., game statistics and/or fantasy football league statistics). In other examples, the augmented reality system can be applied to any sport. In another example, the augmented reality system can be applied to present information (such as supplemental information) associated with any TV show, movie or concert (e.g., actor information, movie information, performer information).

In one embodiment, the augmented reality system can include one or more algorithms for determining an optimal placement of the augmented reality information. For example, the augmented reality information can be placed above, below and/or to the side(s) of the television depending upon the user's position with respect to the television. In another example, the algorithm(s) can use as input head position and/or head movement (e.g., to determine optimal placement of the augmented reality information). In another example, the algorithm(s) can be configured to avoid placing augmented reality displays (e.g., supplemental information) over important background material. In another example, the algorithm(s) for optimal placement of the augmented reality information can use as input past viewing history, what is in the room in terms of background, the time of day, etc.). In another example, the algorithm(s) can analyze the background to facilitate determining optimal placement of the augmented reality information (e.g., if there is a fireplace or light fixture with a high brightness, do not superimpose the augmented reality information on top of such bright location).

In another example, when the field of view of the user changes (e.g., when the user moves his or her head), an intelligent algorithm can keep the augmented reality information in a substantially constant location with respect to the television. In another example, when the augmented reality information comprises video (e.g., of a sporting event) the location of the augmented reality information may be free floating with respect to the television and when the augmented reality information does not comprise video (e.g., the augmented reality information comprises statistics) the location of the augmented reality information may be pinned (that is fixed) in a substantially constant location with respect to the television.

In another embodiment, the augmented reality system can provide the user the ability to re-size and/or re-position the augmented reality information in real-time. In another embodiment, the augmented reality information that is presented can be obtained from a server, a database, a website and/or any other appropriate source. In another example, the augmented reality information can be obtained from a dedicated sports related website.

In another example, the augmented reality information can be obtained based upon metadata in the data stream of the media program being presented on the television (for instance, statistical information can be obtained based upon the metadata in the data stream of the media program).

In one example, image recognition can be applied to an image on the television screen in order to determine what information to search for and present as augmented reality information (e.g., image recognition may be performed to determine player numbers and/or names from their jerseys or other clothing). In another example, image recognition may be performed on a scoreboard to determine a particular game being presented on the television. In another example, what content to obtain to use for the supplemental information can be based upon past consumption history (e.g., prior viewing habits) and/or social media (e.g., what are your friends watching, what have your friends watched in the past).

In another embodiment, a video showing another game may be presented in conjunction with (or instead of) statistical information.

As described herein, an augmented reality system can incorporate (or otherwise be in communication with) a camera, which can enable the augmented reality system to examine the user's current environment. In one example, using an augmented reality application (or "app") on the augmented reality system (and/or on a separate device, such as a smartphone), the augmented reality system (and/or the separate device such as the smartphone) can recognize (e.g., based upon on-screen information and/or on-screen team uniform patterns and/or on-screen team uniform colors) what game is currently being played. If the user links his or her app (on the augmented reality system and/or on the separate device, such as the smartphone) to one or more fantasy football leagues the app can present an augmented reality display adjacent to (e.g., above, below, to a side of) the television screen showing the players on their squad playing in this game (as well as, for example, the opponent's players).

In another example, a profile comprising favorite players, favorite teams etc. can be tied to the augmented reality app. The profile can be associated with a subscription of the user (e.g., a subscription to a media service). In another example, a log-in to the augmented reality app can be tied to a separate sports related app (e.g., a log-in to the augmented reality app can be tied in to a log-in to an AT&T NFL Sunday Ticket™ app).

In one example, if there is no linked fantasy league, the game's stat leaders could be displayed by the augmented reality system. In another example, if a player on the viewer's fantasy squad who is not in the currently viewed game earns points, the augmented reality display could quickly cut to a video or visual text update.

In other examples, while augmented reality displays can appear "fixed" above, below and/or or beside the television screen, if the viewer looks away from the television screen for more than a threshold period of time (e.g., 5 seconds, 10 seconds, 15 seconds, 20 seconds) then a "floating" augmented reality display can be presented in the user's field of view showing, for example, the game that he or she was watching. Such a feature can be useful when, for example, the user leaves a den or TV room to get food from the kitchen for a snack break or to take a bathroom break.

In another example, if the viewer wanted to follow a specific player while watching the television, then using facial recognition, word recognition, number recognition or any combination thereof, when the player is on the television screen the augmented reality system could "highlight" that player for the user to follow.

In another example, the augmented reality system can allow a viewer to open a separate augmented reality display showing (in real-time), for example, another game (similar to a PIP feature). In this example, the user could, on the fly, re-size and re-position this augmented reality display for an optimal viewing experience.

In another example, via use of one or more microphones (e.g., built in to the augmented reality system), any requested information could be provided under the control of voice commands Similarly, any requested modifications (e.g., repositioning of augmented reality display region(s)) could be provided under the control of voice commands In other embodiments, control of various functions (e.g., display area positioning or re-positioning) can be via gestures, such as hand gestures (the gesture input can be captured, for example, by a camera on the augmented reality headgear).

In other examples, various embodiments can be applied to college and/or professional football, baseball, basketball, hockey, soccer, handball, table tennis, etc.

In one specific example, the augmented reality system can be in operative communication (e.g., bi-directional communication) with the user's home Wi-Fi network (which can provide, for example, a communication path between the augmented reality system and a separate device, such as a smartphone). In another example, a communication path between the augmented reality system and the separate device (such as a smartphone) can be via BLUETOOTH and/or any other appropriate mechanism.

Conventionally, if a user wants live, up-to-date stats on his or her favorite players, fantasy leagues, or second games (while watching a game on his or her primary television screen), then there is typically a second screen. This second screen will often be a laptop, a tablet, or a phone. Using a wearable augmented reality device as discussed herein, there can be (in various embodiments) no need for such an alternate screen. Further, by implementing voice and/or gesture controls, ease of use is provided.

As described herein, an augmented reality system (and/or an augmented reality device) can present to a user objects in a field of view of the user such that the objects are presented to the user as the objects actually exit. In addition, various augmented reality display regions (comprising, for example, information and/or media programs) can be superimposed in the field of view of the user.

As described herein, there are potential benefits for advertisers, since viewers can be more likely to keep their eyes on the primary television viewing screen area during commercial breaks.

Figure 7:
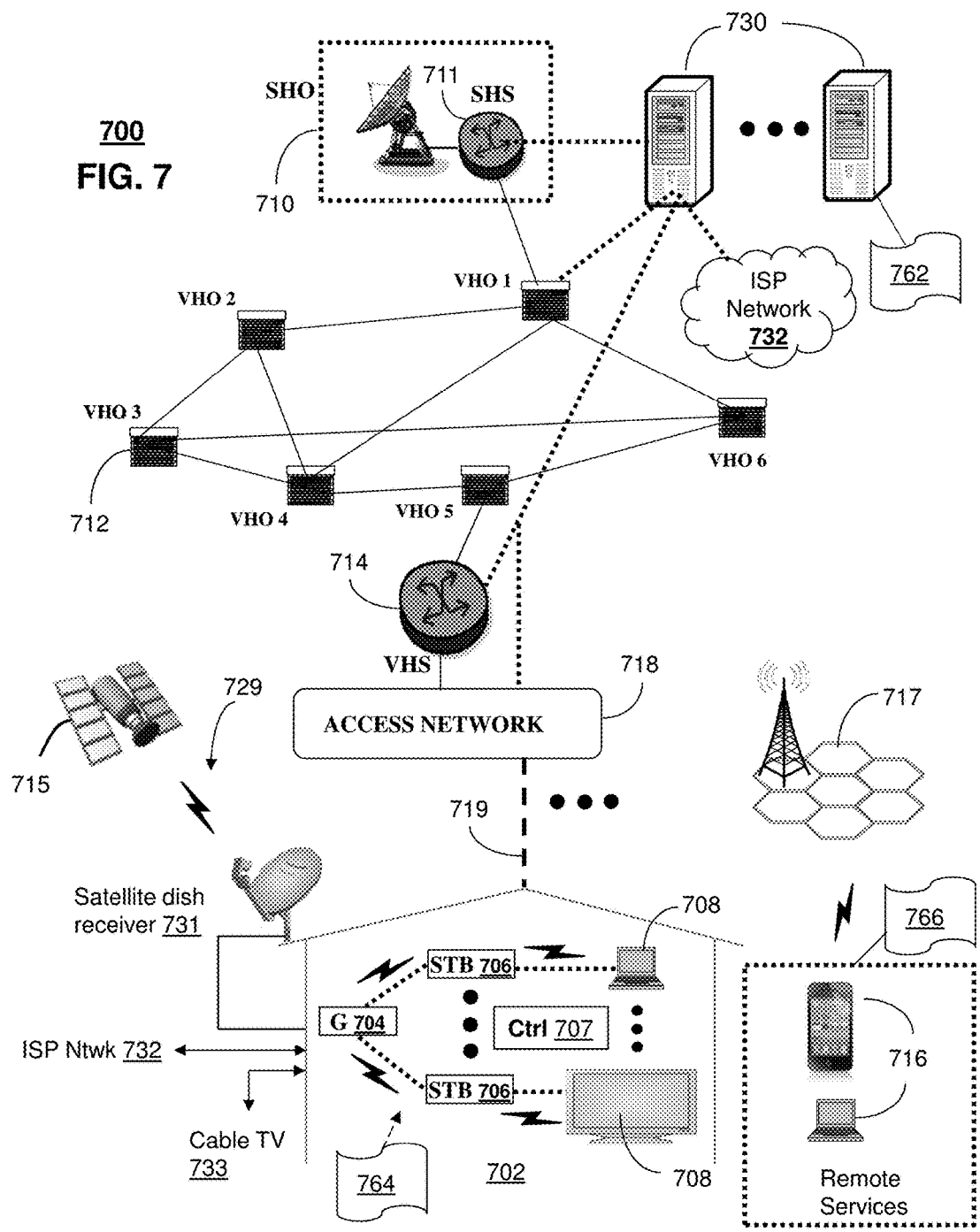
FIG. 7 depicts an illustrative embodiment of a communication system that provides media services that can be used in connection with providing content by use of the systems of FIGS. 1A-1B, 2A-2B, 3A-3B, 4A-4B, and/or 5A-5B and/or the methods of FIGS. 6A-6C.

FIG. 7 depicts an illustrative embodiment of a communication system 700 for providing various communication services, such as delivering media content. The communication system 700 can represent an interactive media network, such as an interactive television system (e.g., an Internet Protocol Television (IPTV) media system). Communication system 700 can be overlaid or operably coupled with devices of FIGS. 1A-1B, 2A-2B, 3A-3B, 4A-4B, and/or 5A-5B as another representative embodiment of communication system 700. For instance, one or more devices illustrated in the communication system 700 of FIG. 7 can facilitate augmented reality presentations.

In one or more embodiments, the communication system 700 can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as an augmented reality system (herein referred to as augmented reality system 730). The augmented reality system 730 can use computing and communication technology to perform function 762, which can include among other things, the augmented reality presentation techniques described by method 600, 640 and/or 660. For instance, function 762 of augmented reality system 730 can be similar to the functions described for media content server 104, information server 106, set-top box 105 and/or augmented reality device 102 of FIG. 1A and/or for media content server 154, information server 156, set-top box 155 and/or augmented reality system 170 of FIG. 1B in accordance with method 600, 640 and/or 660. The media processors 706 and wireless communication devices 716 can be provisioned with software functions 764 and 766, respectively, to utilize the services of augmented reality system 730. For instance, functions 764 and 766 of media processors 706 and wireless communication devices 716 can be similar to the functions described for set-top box 105 and/or augmented reality device 102 of FIG. 1A and/or for set-top box 155 and/or augmented reality system 152 of FIG. 1B in accordance with method 600, 640 and/or 660.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
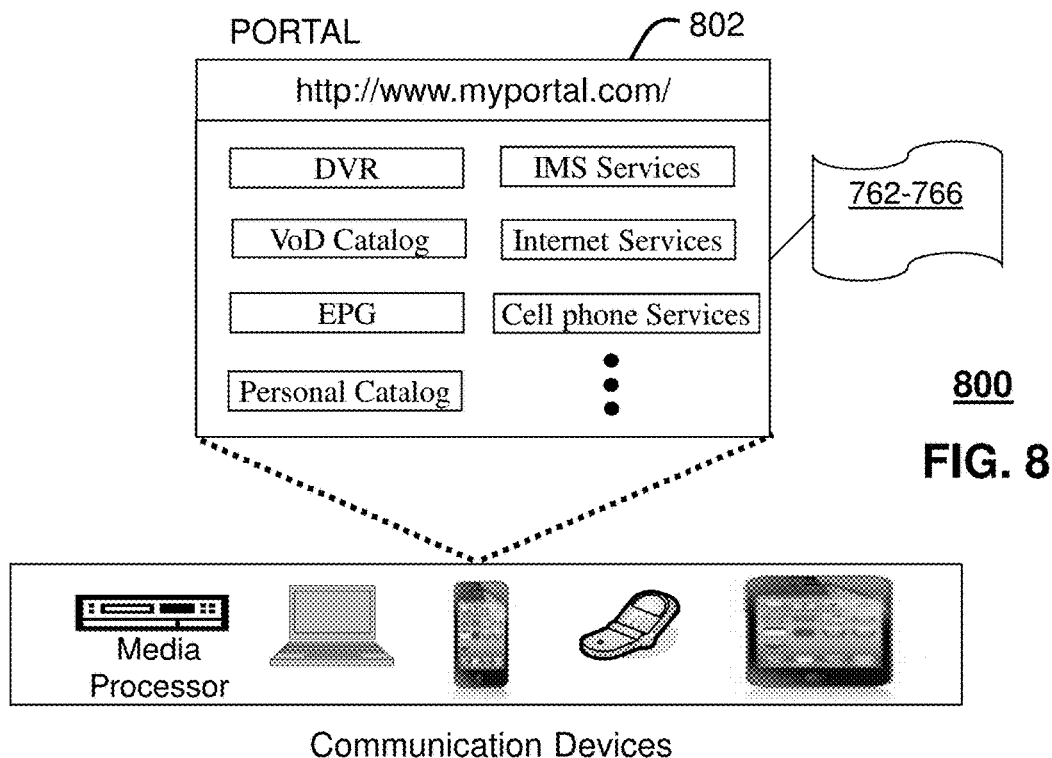
FIG. 8 depicts an illustrative embodiment of a web portal for interacting with the systems of FIGS. 1A-1B, 2A-2B, 3A-3B, 4A-4B, 5A-5B and/or 7 and/or the methods of FIGS. 6A-6C in order to provide augmented reality presentations.

FIG. 8 depicts an illustrative embodiment of a web portal 802 of a communication system 800. Communication system 800 can be overlaid or operably coupled with devices of FIGS. 1A-1B, 2A-2B, 3A-3B, 4A-4B, and/or 5A-5B and/or communication system 700 as another representative embodiment of FIGS. 1A-1B, 2A-2B, 3A-3B, 4A-4B, and/or 5A-5B and/or communication system 700. The web portal 802 can be used for managing services of devices of FIGS. 1A-1B, 2A-2B, 3A-3B, 4A-4B, and/or 5A-5B and/or communication system 700. A web page of the web portal 802 can be accessed by a Uniform Resource Locator (URL) with an Internet browser using an Internet-capable communication device such as those described in FIGS. 1A-1B, 2A-2B, 3A-3B, 4A-4B, and/or 5A-5B and/or communication system 700. The web portal 802 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 802 can also be used for provisioning IMS services described earlier, provisioning Internet services, provisioning cellular phone services, and so on.

The web portal 802 can further be utilized to manage and provision software applications 762-766, to adapt these applications as may be desired by subscribers and/or service providers of devices of FIGS. 1A-1B, 2A-2B, 3A-3B, 4A-4B, and/or 5A-5B and/or communication system 700. For instance, users of the services provided by media content server 104, information server 106, set-top box 105 and/or augmented reality device 102 of FIG. 1A and/or by media content server 154, information server 156, set-top box 155 and/or augmented reality system 170 of FIG. 1B, and/or by augmented reality system 730 can log into their on-line accounts and provision the devices with user profiles, provide contact information to (e.g., enable communication with various devices) and so on. Service providers can log onto an administrator account to provision, monitor and/or maintain the media content server 104, information server 106, set-top box 105 and/or augmented reality device 102 of FIG. 1A and/or media content server 154, information server 156, set-top box 155 and/or augmented reality system 170 of FIG. 1B, and/or augmented reality system 730.

Figure 9:
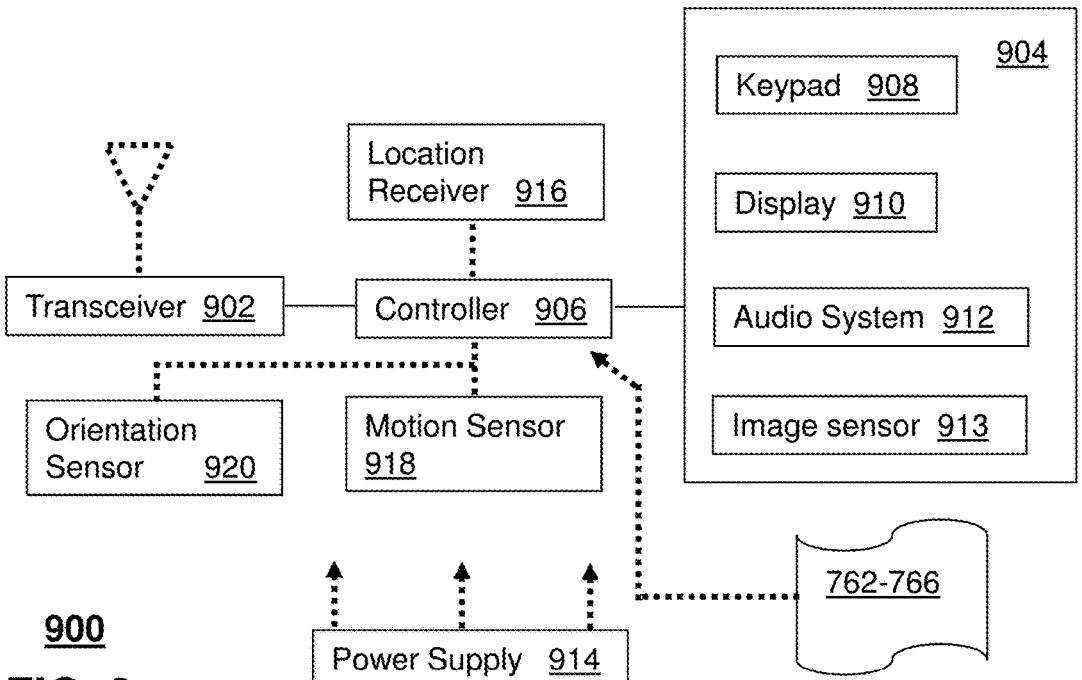
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1A-1B, 2A-2B, 3A-3B, 4A-4B, and/or 5A-5B and/or communication system 700 and can be configured to perform portions of method 600, 640 and/or 660.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIGS. 1A-1B, 2A-2B, 3A-3B, 4A-4B, and/or 5A-5B, the media processor 706, the media devices 708, or the portable communication devices 716 of FIG. 7. It will be appreciated that the communication device 900 can also represent other devices that can operate in FIGS. 1A-1B, 2A-2B, 3A-3B, 4A-4B, and/or 5A-5B and/or communication system 700 such as a gaming console and a media player. In addition, the controller 906 can be adapted in various embodiments to perform the functions 762-766.

Upon reviewing the aforementioned embodiments, it would be evident to an artisan with ordinary skill in the art that said embodiments can be modified, reduced, or enhanced without departing from the scope of the claims described below. For example, any desired number of augmented reality device(s) and/or augmented reality system(s) can communicate with any desired number of set-top box(es), television(s) and/or servers(s). Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
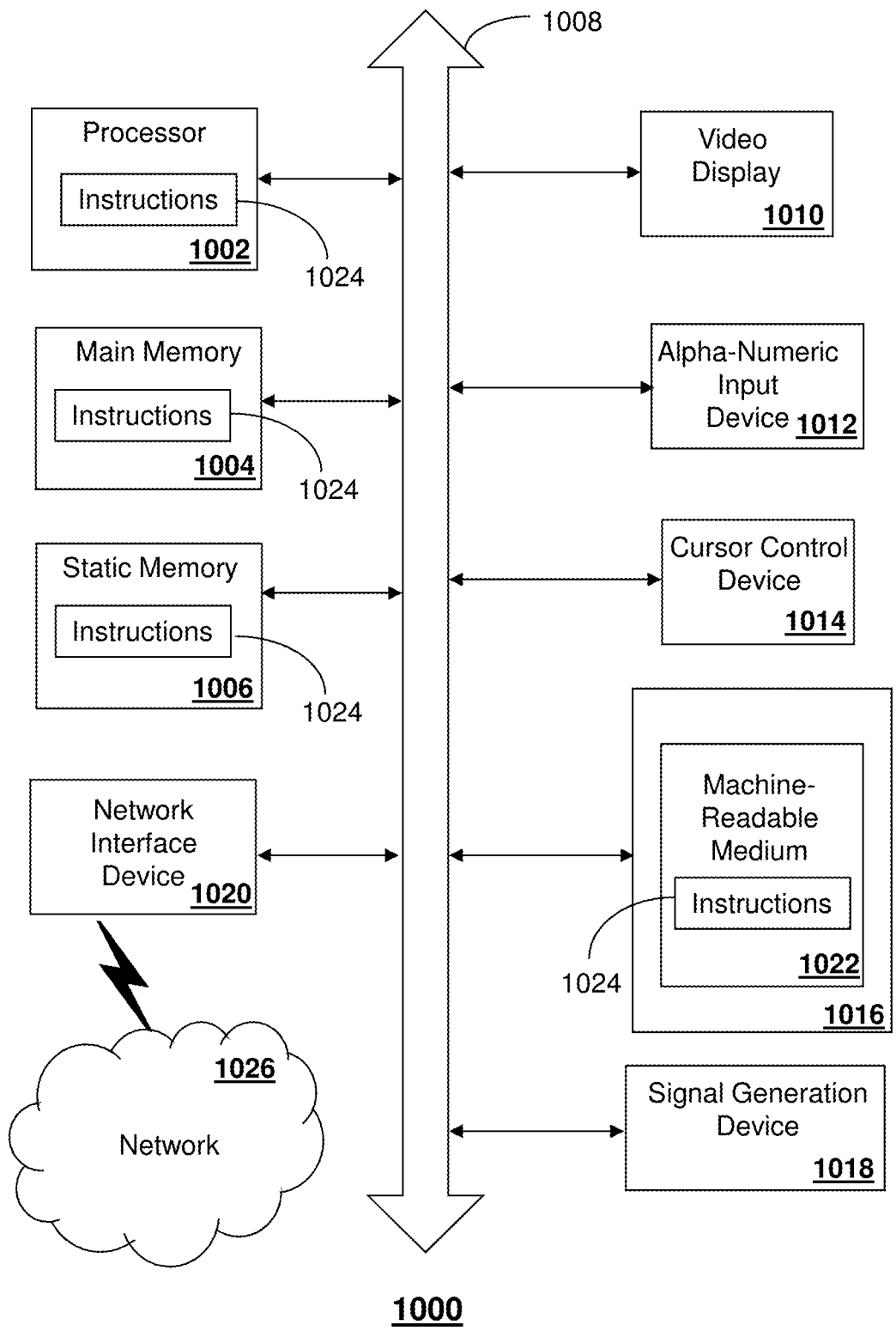
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above.

One or more instances of the machine can operate, for example, as the augmented reality system 730, the media processor 706 and/or one or more devices of FIGS. 1A-1B, 2A-2B, 3A-3B, 4A-4B, and/or 5A-5B. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

determining, by a processing system including a processor and an augmented reality device, that a display, upon which is being presented a media program, is within a field of view of a user who is using the augmented reality device, wherein the display is not part of the augmented reality device and wherein the field of view of the user is presented to the user via the augmented reality device;

presenting, via the augmented reality device, a first augmented reality display region, wherein the first augmented reality display region shows information associated with the media program, and wherein the first augmented reality display region is positioned adjacent the display in the field of view of the user;

determining, by the processing system, that the field of view of the user has been changed such that the display is no longer in the field of view of the user; and responsive to the determining that the field of view of the user has been changed such that the display is no longer in the field of view of the user, presenting, via the augmented reality device, a second augmented reality display region, wherein the second augmented reality display region shows the media program that is being presented on the display.

2. The method of claim 1, wherein:

the determining that the field of view of the user has been changed such that the display is no longer in the field of view of the user comprises determining that the field of view of the user has been changed, for more than a threshold period of time, such that the display is no longer in the field of view of the user; and the second augmented reality display region is presented responsive to the determining that the field of view of the user has been changed, for more than the threshold period of time, such that the display is no longer in the field of view of the user.

3. The method of claim 1, further comprising:

determining, by the processing system, subsequent to the second augmented reality display region being presented, that the display upon which the media program is being presented is once again within the field of view of the user;

ceasing presentation via the augmented reality device of the second augmented reality display region; and presenting, via the augmented reality device, a third augmented reality display region, wherein the third augmented reality display region shows the information associated with the media program.

4. The method of claim 3, wherein the third augmented reality display region replaces the first augmented reality display region.

5. The method of claim 1, wherein the augmented reality device comprises a camera, wherein the determining that the display is within the field of view of the user is based upon one or more images from the camera, and wherein the camera comprises a still image camera, a video camera, or any combination thereof.

6. The method of claim 1, wherein the augmented reality device comprises a camera, wherein the determining that the field of view of the user has been changed such that the display is no longer in the field of view of the user is based upon one or more images from the camera, and wherein the camera comprises a still image camera, a video camera or any combination thereof.

7. The method of claim 1, wherein the media program comprises a sporting event, and wherein the information associated with the sporting event comprises fantasy league information.

8. The method of claim 1, wherein the media program comprises a sporting event, and wherein the sporting event comprises football, basketball, baseball, soccer, hockey, track and field, auto racing, boat racing, horse racing, dog racing or any combination thereof.

9. The method of claim 1, wherein the first augmented reality display region being positioned adjacent the display in the field of view of the user comprises:

the first augmented reality display region being positioned above the display in the field of view of the user;

the first augmented reality display region being positioned below the display in the field of view of the user;

the first augmented reality display region being positioned to a left side of the display in the field of view of the user; or the first augmented reality display region being positioned to a right side of the display in the field of view of the user.

10. The method of claim 1, wherein the display comprises a television.

11. The method of claim 1, wherein the augmented reality device comprises headgear.

12. The method of claim 1, wherein the augmented reality device comprises glasses, goggles, a visor, a helmet, or any combination thereof.

13. A non-transitory machine-readable storage medium comprising executable instructions that, when executed by a system including a processor and an augmented reality device, facilitate performance of operations, the operations comprising:

detecting, by the system, one or more objects that are within a field of view of a user who is using the augmented reality device, wherein the one or more objects are not part of the augmented reality device and wherein the field of view of the user is presented to the user via the augmented reality device;

determining, by the system, that the one or more objects are being presented in a media program;

presenting, via the augmented reality device, a first augmented reality display region, wherein the first augmented reality display region shows information associated with the one or more objects that are within the field of view of the user, and wherein the first augmented reality display region is positioned in the field of view of the user;

determining, by the system, that the field of view of the user has been changed such that the one or more objects are no longer in the field of view of the user; and responsive to the determining that the field of view of the user has been changed such that the one or more objects are no longer in the field of view of the user, presenting, via the augmented reality device, a second augmented reality display region, wherein the second augmented reality display region shows the media program.

14. The non-transitory machine-readable storage medium of claim 13, wherein the one or more objects are presented on a television screen and wherein the detecting the one or more objects is performed by detecting the one or more objects on the television screen.

15. The non-transitory machine-readable storage medium of claim 13, wherein the field of view of the user is presented to the user via a see-through lens portion of the augmented reality device or the field of view of the user is presented to the user via a display screen of the augmented reality device.

16. A device comprising:
a processing system including a processor;
an augmented reality device; and
a memory that stores executable instructions that, when executed by the processing system, facilitate performance of operations, the operations comprising:
determining that a display, upon which is being presented a media program, is within a field of view of a user who is using the augmented reality device, wherein the display is not part of the augmented reality device and wherein the field of view of the user is presented to the user via the augmented reality device;
presenting, via the augmented reality device, a first augmented reality display region, wherein the first augmented reality display region shows information associated with the media program, and wherein the first augmented reality display region is positioned adjacent the display in the field of view of the user;
determining that the field of view of the user has been changed such that the display is no longer in the field of view of the user; and
responsive to the determining that the field of view of the user has been changed such that the display is no longer in the field of view of the user, presenting, via the augmented reality device, a second augmented reality display region, wherein the second augmented reality display region shows the media program that is being presented on the display.

17. The device of claim 16, wherein:
the determining that the field of view of the user has been changed such that the display is no longer in the field of view of the user comprises determining that the field of view of the user has been changed, for more than a threshold period of time, such that the display is no longer in the field of view of the user; and
the second augmented reality display region is presented responsive to the determining that the field of view of the user has been changed, for more than the threshold period of time, such that the display is no longer in the field of view of the user.

18. The device of claim 16, wherein the operations further comprise:
determining subsequent to the second augmented reality display region being presented, that the display upon which the media program is being presented is once again within the field of view of the user;
ceasing presentation via the augmented reality device of the second augmented reality display region; and
presenting, via the augmented reality device, a third augmented reality display region, wherein the third augmented reality display region shows the information associated with the media program.

19. The device of claim 18, wherein the third augmented reality display region replaces the first augmented reality display region.

20. The device of claim 16, wherein the augmented reality device comprises a camera, wherein the determining that the display is within the field of view of the user is based upon one or more images from the camera, and wherein the camera comprises a still image camera, a video camera, or any combination thereof.

* * * * *